United States Patent
Leber

(10) Patent No.: US 11,235,654 B2
(45) Date of Patent: Feb. 1, 2022

(54) AXLE ASSEMBLY

(71) Applicant: Dana Heavy Vehicle Systems Group, LLC, Maumee, OH (US)

(72) Inventor: Mark W. Leber, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/994,105

(22) Filed: Aug. 14, 2020

(65) Prior Publication Data

US 2021/0070159 A1    Mar. 11, 2021

Related U.S. Application Data

(60) Provisional application No. 62/898,584, filed on Sep. 11, 2019.

(51) Int. Cl.

| | |
|---|---|
| *B60K 1/00* | (2006.01) |
| *F16H 57/04* | (2010.01) |
| *F16D 3/06* | (2006.01) |
| *B60K 17/16* | (2006.01) |
| *F16H 57/02* | (2012.01) |
| *F16C 25/06* | (2006.01) |
| *F16H 57/037* | (2012.01) |
| *F16C 33/76* | (2006.01) |

(52) U.S. Cl.
CPC .............. *B60K 1/00* (2013.01); *B60K 17/165* (2013.01); *F16C 25/06* (2013.01); *F16D 3/06* (2013.01); *F16H 57/02* (2013.01); *F16H 57/037* (2013.01); *F16H 57/0408* (2013.01); *F16H 57/0476* (2013.01); *B60K 2001/001* (2013.01); *F16C 33/76* (2013.01); *F16H 2057/02034* (2013.01); *F16H 2057/02052* (2013.01)

(58) Field of Classification Search
None
See application file for complete search history.

(56) References Cited

U.S. PATENT DOCUMENTS

| | | | |
|---|---|---|---|
| 5,046,870 A * | 9/1991 | Ordo | F16C 25/06 |
| | | | 384/563 |
| 6,269,422 B1 | 8/2001 | Moll | |
| 7,503,867 B2 | 3/2009 | Fahrni, Jr. et al. | |
| 8,475,320 B2 * | 7/2013 | Kwon | F16C 25/06 |
| | | | 475/230 |
| 8,534,925 B1 | 9/2013 | Stambek | |

(Continued)

FOREIGN PATENT DOCUMENTS

| | | | |
|---|---|---|---|
| CN | 104373516 A | * | 2/2015 |
| CN | 110454566 A | * | 11/2019 |

(Continued)

*Primary Examiner* — Dirk Wright
(74) *Attorney, Agent, or Firm* — McCoy Russell LLP

(57) ABSTRACT

A method and system for an axle assembly are provided. The axle assembly, in one example, includes a cover at least partially circumferentially surrounding a shaft, a bearing coupled to the shaft and the cover, the bearing including an outer race, and a bearing adjuster including a first axial side adjacent to the outer race and configured to set a bearing preload and/or end play. The assembly further includes a lubricant seal spaced axially away from the bearing adjuster and sealing a lubricant bore and the lubricant bore traverses the cover and extends axially toward the bearing adjuster.

19 Claims, 4 Drawing Sheets

(56) References Cited

U.S. PATENT DOCUMENTS

| | | | |
|---|---|---|---|
| 8,858,379 B2* | 10/2014 | Keeney | B60L 7/12 |
| | | | 475/150 |
| 9,022,890 B2 | 5/2015 | Smetana et al. | |
| 10,161,493 B2 | 12/2018 | Jonas | |
| 10,500,941 B2* | 12/2019 | Garcia | B60K 17/165 |
| 10,801,602 B2* | 10/2020 | Peng | F16H 57/082 |
| 10,808,830 B2* | 10/2020 | Begov | F16H 57/0476 |
| 10,808,834 B2* | 10/2020 | Soffner | B60K 17/16 |
| 11,034,237 B2* | 6/2021 | Hirao | F16H 59/041 |
| 2014/0349802 A1* | 11/2014 | Steiner | F16H 57/0472 |
| | | | 475/150 |
| 2018/0297401 A1* | 10/2018 | Liu | B60T 8/32 |
| 2019/0054816 A1* | 2/2019 | Garcia | F16H 48/08 |

FOREIGN PATENT DOCUMENTS

| | | | |
|---|---|---|---|
| CN | 111075909 A * | 4/2020 | |
| JP | 2011106639 A * | 6/2011 | F16C 25/06 |
| WO | WO-2018062417 A1 * | 4/2018 | F16H 57/037 |

* cited by examiner

AXLE ASSEMBLY

CROSS-REFERENCE TO RELATED APPLICATION

The present application claims priority to U.S. Provisional Application No. 62/898,584, entitled "AXLE ASSEMBLY", and filed Sep. 11, 2019. The entire contents of the above-listed application are hereby incorporated by reference for all purposes.

TECHNICAL FIELD

The invention generally relates to a system and method for an axle assembly. More particularly, the invention relates to an axle assembly with a bearing adjuster.

BACKGROUND AND SUMMARY

Some vehicles have made use of electric and power axle assemblies to transfer power to drive wheels. These axle assemblies include bearings at certain locations to support and enable rotation of various components. In certain assemblies, gearboxes attach to an electric motor output. At this attachment point may reside a gear mesh which serves as an interface between the electric motor and downstream gears. Bearings support the gears in the interface between the motor and the gears. The bearings may exhibit undesirable axial end play or preload in part to component manufacturing tolerances and/or installation variances, for example. Bearings in other axle locations may also exhibit undesirable end play or preload, in some cases.

One example approach for preloading a bearing to decrease end play is shown in U.S. Pat. No. 10,161,493 B2 to Jonas. In Jonas' system, a bearing adjuster preloads a differential bearing in a powertrain with an internal combustion engine. Other approaches for preloading bearings include arranging shims in face sharing contact with a gear shaft bearing.

The inventor has found some issues with the approach described by Jonas and other bearing preloading techniques. For instance, Jonas' system does not provide lubricant to the bearing. Consequently, the bearing may exhibit unwanted degradation which decreases the bearing's lifespan. Additionally, preloading the bearings with the shims, as discussed above, may in some instances necessitate a convoluted and time consuming disassembly process. The lengthy disassembly process may be demanded if the shim's width, determined earlier in assembly, does not correspond to a targeted amount of bearing preload after assembly. Consequently, if bearing preload adjustment is needed, manufacturing delays may occur.

To overcome at least a portion of the aforementioned challenges, an axle assembly is provided. The axle assembly includes a cover at least partially circumferentially surrounding a shaft. The assembly further includes a bearing coupled to the shaft and the cover. The bearing comprises an outer race. The assembly further includes a bearing adjuster configured to set bearing preload or end play. A lubricant seal spaced axially away from the bearing adjuster and sealing a lubricant bore is further provided in the assembly. The lubricant bore traverses the cover and extends axially toward the bearing adjuster. The arrangement of the lubricant seal away from the bearing adjuster in the cover allows the bearing adjuster to be accessed at a later axle assembly stage, if so desired. Consequently, the likelihood of inaccurate bearing preload or end play may be reduced and installation efficiency may be increased.

In another example, the axle assembly may further comprise an attachment device threaded into an extension of the cover. A distal end of the attachment device may mate with a recess in an axial side of the bearing adjuster. In this way, an axially aligned attachment device, such as a bolt, retains the bearing adjuster in desired position after setting bearing preload, for example. This bearing adjuster retention may drive down the chance of unwanted variations in bearing preload.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-5 are drawn approximately to scale. However, other relative dimensions of the components may be used, in other embodiments.

DETAILED DESCRIPTION

Figure 1:
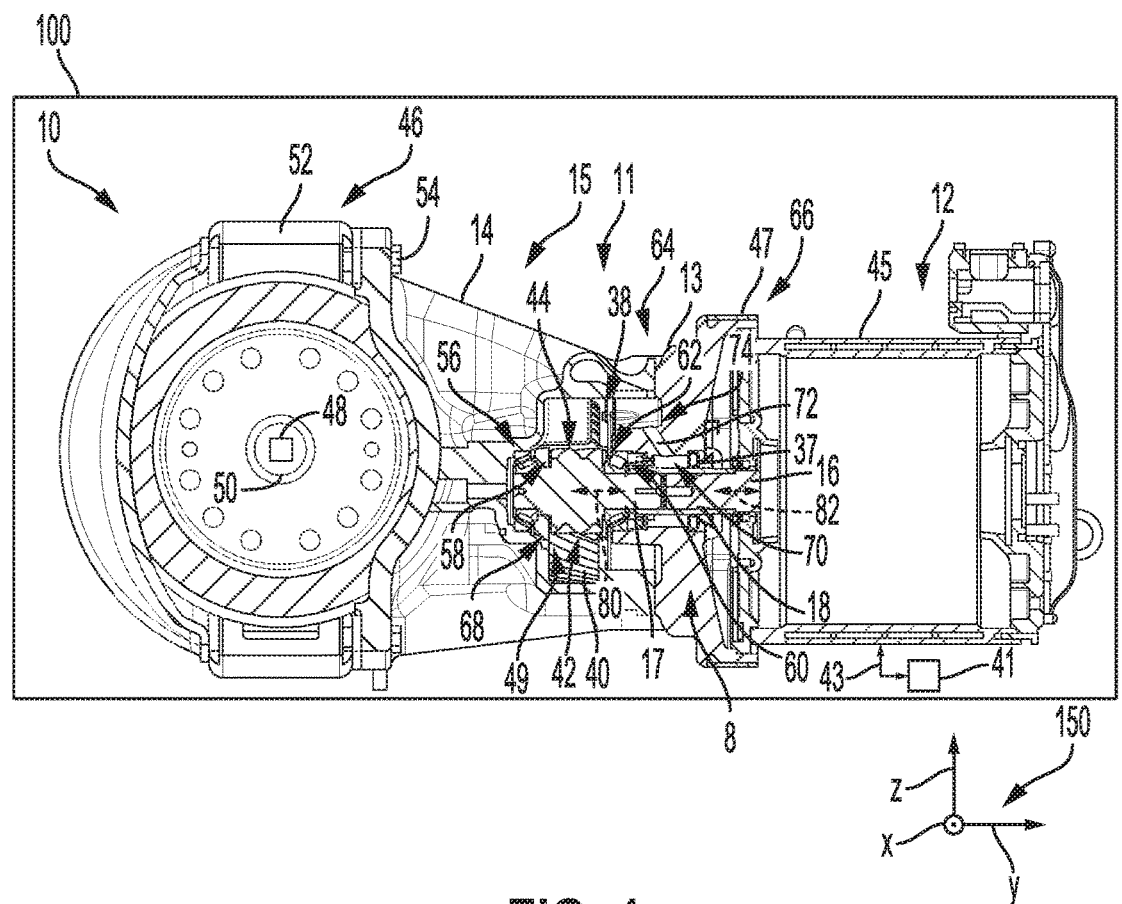
FIG. 1 shows a partial sectional view of an embodiment of an electric axle.

An axle assembly space-efficiently facilitating bearing preload/end play adjustment and lubricant bore sealing is described herein. The axle assembly may include a cover which at least partially circumferentially surrounds a shaft. The assembly may further include a bearing coupled to the shaft and the cover and a bearing adjuster which is designed to set the bearing into preload (negative gap) or end play (positive gap). In this way, the preload or end play of the bearing may be adjusted as wanted to decrease bearing wear and increase bearing longevity. A lubricant seal, residing in the cover, is spaced axially away from the bearing adjuster and seals a lubricant bore axially traversing the cover. By spacing the seal away from the bearing adjuster, installation personnel may access the adjuster through the lubricant bore to alter bearing preload or end play at a later stage in the installation process, if desired. To elaborate, installation personnel may manipulate the bearing adjuster without removing the cover, which may increase adjustment efficiency and lead to more efficient manufacturing and maintenance, if wanted.

Described herein are electric powertrain configurations that may be used in hybrid and electric vehicles. In some embodiments, commercial vehicles or trailers having two or more rear axles include an axle having steerable wheels at the front end of the vehicle and tandem axles at the rear of the vehicle. The axles in the tandem axle system may be a drive axle or a dead axle. When an additional axle (e.g., a secondary axle) is a dead axle, it may be positioned before or after a drive axle. Thus, the additional axle may be a pusher or tag axle. In other embodiments, both of the axles in the tandem arrangement may be drive axles. Further, in some embodiments, the drive axles may include an electrically driven axle and an engine drive axle. In such an embodiment, the electric axle may supplement torque during a drive mode and braking during a regenerative mode, for instance.

Certain tandem axle systems may include two wheels on the steer axle and four wheels on the tandem axles. In some configurations, two wheels of the four wheels on the tandem axle may be driven. In other configurations, four wheels on the tandem axle may be driven. In further configurations, a tandem axle may include an electrically driven axle and an engine driven axle. Thus, in one use-case embodiment, the powertrain may include an electric tag axle having an electric machine (e.g., motor-generator), one or multiple reducing gear sets mounted on co-axial parallel shafts or transverse shafts, and a differential assembly. In further embodiments, the powertrain may include disconnect features and over run clutches. In some embodiments, the electric powertrains may be part of electric axles which are incorporated into vehicles as tag or secondary axles in tandem or multiple axle vehicle systems. More generally, the powertrain described herein includes an electric axle.

FIG. 1 shows an embodiment of an electric axle 10 included in a vehicle 100. Thus, the electric axle 10 may provide torque to vehicle wheels in any of the previously described axle variants. In one embodiment, the vehicle 100 may be a light, medium, or heavy vehicle such as a truck, passenger vehicle, industrial vehicle, agricultural vehicle, and the like. The electric axle 10 includes an axle assembly 11. The axle assembly 11 may be coupled to an electric machine 12 providing torque thereto. Said electric machine be a motor-generator, in one example. However, in an alternate example, the electric machine 12 may function solely as a motor. The electric machine 12 may include an output shaft 16 rotationally attached to an input shaft 17 of the axle assembly 11. A sleeve 18 circumferentially surrounding at least a portion of each of the input and output shafts 17, 16 may connect the shafts. To elaborate, the coupling sleeve 18 may have a generally annular body with a splined inner face configured to engage mating splines provided on the output shaft 16 and the input shaft 17. Additional or alternative shaft attachment techniques may be used such as bolting, clamping, etc. In this way, torque transfer may occur between the axle assembly 11 and the electric machine 12. A rotational axis 80 of the input shaft 17 and a rotational axis 82 of the output shaft 16 are further provided in FIGS. 1 and 2-5, when appropriate, for reference. These axes may be aligned with one another. However, the electric motor's rotational axis may be offset from the axis 80, in embodiments where a gear coupled to the motor output functions as an input for the shaft 16, for instance.

An energy storage device 41 (e.g., battery, capacitor, etc.) in the vehicle 100 may electrically couple to the electric machine 12. Arrows 43 denote the transfer of energy between the energy storage device 41 and the electric machine 12.

A cover 13 of the axle assembly 11 may couple to a housing 45 of the electric machine 12 via bolts 47 and/or other suitable attachment apparatuses (e.g., clamps, clips, and the like). The electric machine 12 may be coupled to the cover 13 subsequent to installation of the cover and other axle assembly components with an axle subassembly 15 (e.g., power transfer subassembly). The axle subassembly 15 may include a gear reduction 49 with a plurality of gears. One gear 40 in the gear reduction 49 forms a gear mesh 42 with a gear 44 on the input shaft 17. It will be appreciated that the mesh may be formed via mated teeth of the gears. As described herein, a gear may be a component with teeth designed to form a mesh with gears to which it is directly coupled.

The axle subassembly 15 may further include a gear housing 14 at least partially surrounding the gears in the gear reduction 38. Thus, the gear housing 14 may enclose gearing and/or other suitable power transmitting components for the transfer of torque between the electric machine 12, the axle assembly 11, and subassembly 15.

A differential 46 may be further included in the axle subassembly 15. The differential 46 may allow for speed deviation between drive wheels, schematically indicated at 48, during some conditions. For instance, the differential may be an open differential, locking differential, limited slip differential, etc. Axle shafts 50 may provide rotational attachment between differential gears (e.g., side gears) and the drive wheels 48. The differential 46 may include conventional components such as a ring gear, a carrier, side gears, pinion gears, helical gears, combinations thereof, and the like. A housing 52 of the differential 46 is shown coupled to the gear housing 14 via attachment apparatuses 54, although other housing profiles have been envisioned.

The axle assembly 11 may further include a bearing 56 coupled to a first side 58 of the gear 44 and a bearing 60 coupled to a second side 62 of the gear 44. The second side 62 of the gear 44 may be closer to the electric machine 12 than the first side 58 of the gear, in the illustrated embodiment. The bearing 56 may reside in a bore 57 in the gear housing 14.

In some embodiments, the cover 13 may provide structural support for attaching and sealing the electric machine 12 to the axle assembly 11. The cover 13 may have a first side 64 interfacing with the gear housing 14. Bolts, clamps, and/or other suitable attachment apparatuses may enable removable attachment of the cover 13 to the gear housing 14. The cover 13 may have a second side 66 interfacing with the housing 45 of electric machine 12. The cover 13 may have a central opening 68 which may extend axially from the first side 64 and the second side 66. Various bores in the interior of the cover 13 interface with components in the axle assembly 11 such as the bearing 60 and a bearing adjuster 22. The bearing adjuster 22 is configured to adjust preload and end play of the bearing 60. In this way, bearing preload or end play may be adjusted during manufacturing, according to design goals, for instance. Consequently, the wear in the gear mesh may be reduced, and axle longevity may be increased.

The bearing adjuster 22 may be arranged internally in the cover 13 at a location spaced away from a lubricant seal 37. The lubricant seal 37 fluidically seals a lubricant bore 70 axially extending through the cover 13. The inner radial boundary of the lubricant bore 70 may be formed via an outer surface of the sleeve 18 while the outer radial boundary of the bore 70 may be formed via an interior surface of the cover 13. The lubricant bore 70 may have a generally cylindrical shape to allow the adjuster 22 to be accessed for tooling, in one example. In other examples, the lubricant bore 70 may taper in a direction extending toward the bearing 60 to allow tools with a larger profile to be inserted therein. However, alternate lubricant bore contours have been envisioned.

An outer surface of the lubricant seal 37 may contact an interior surface of the cover 13 and an inner surface contacts the outer circumference of the sleeve 18. The bearing adjuster 22 may be accessible through the lubricant bore 70 during certain stages of axle assembly. Allowing the adjuster to be accessed internally through the bore enables the bearing's end play and preload to be adjusted at a later stage in installation via personnel, in some cases. This adjustment to the installation process has the potential to decrease manufacturing complexity, duration, and cost, if so desired. The bearing adjuster may also be more easily accessed during maintenance and repair. As described herein, end play is an axial displacement (positive axial displacement) that may be exhibited by the bearing or other components. Conversely, preload is axial displacement (negative axial displacement) that may be exhibited by the bearing or other components. The internal placement of the bearing adjuster 22 with regard to the cover 13 may also reduce the chance of lubricant leaks in relation to axles with adjusters that are externally accessed. Furthermore, spacing the bearing adjuster 22 away from the lubricant seal 37 may reduce or prevent seal interaction with the bearing and adjuster, thereby decreasing seal wear. Consequently, the system's lifespan may be increased, owing in part to a reduction in the scale and/or number of seal leaks.

In the design process, the sizing of the outer diameters of the bearing and bearing adjuster, 60 and 22 respectively, may occur independently from the sizing of outer diameter the lubricant seal 37. The independent sizing of the bearing adjuster and lubricant seal may be achieved due to the spacing between the seal and bearing. In other words, the seal's size may not correlate to the bearing adjuster's size, if desired, unlike axles with seals sized to interface with bearing shims. For instance, in one use-case example, the outer diameter 71 of the bearing 60 may be increased without necessitating a corresponding increase in the outer diameter 73 of the lubricant seal 37. In this way, greater design flexibility may be achieved, if wanted. A larger bearing may be useful in applications experiencing higher loads. Furthermore, additional space efficiency benefits may be derived from the disproportionate sizing of the bearing and seal. For example, in another use-case, the diameter of the seal bore may be smaller than the adjuster's outer diameter, which may allow parts surrounding the seal to be brought radially inward in relation to the lubricant bore, for instance. Thus, in one example, the outer diameter 71 of the bearing 60 may be less than or equal to the outer diameter 73 of the lubricant seal 37.

A lubricant passage 72 in fluidic communication with the lubricant bore 70 may be included in the cover 13. The lubricant passage 72 may extend through the cover at an angle biasing the rotational axis 80 of the input shaft 17. The biased angle of the lubricant passage may allow lubricant to be routed from components in the axle subassembly 15 (e.g., ring gear splash) to the lubricant bore 70 and bearing 60. Thus, the lubricant passage may extend axially away from the lubricant seal 37. The lubricant passage 72 and lubricant bore 70 may therefore be included in a lubrication system 74 designed to route lubricant to axle components. The lubrication system may include additional passages, a lubricant reservoir, check valves, etc. and in the case of an active system pumps, controllable valves, and the like. Passive lubrication techniques such as splash type systems may also be deployed, in other embodiments. An axis system 150 is provided in FIG. 1, as well as in FIGS. 2-5, for reference. The z-axis may be a vertical axis, the x-axis may be a lateral axis, and/or the y-axis may be a longitudinal axis, in one example. The axes may have other orientations, in other examples.

Figure 2:
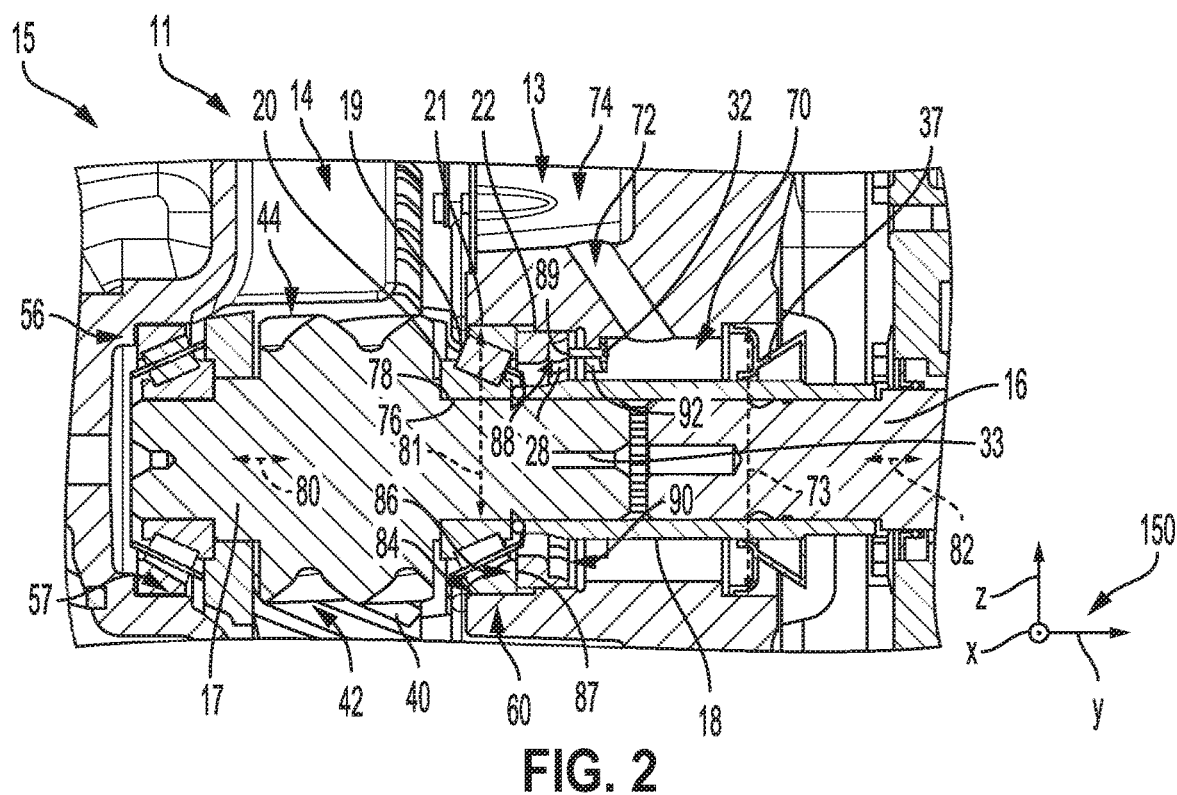
FIG. 2 shows an enlarged cross sectional view of an axle assembly in the electric axle, depicted in FIG. 1.

FIG. 2 shows an expanded view of the axle assembly 11 with the input shaft 17 rotationally coupled to the electric machine output shaft 16 via the cover 13. The sleeve 18 which may function as the attachment point between the input shaft 17 and the output shaft 16 may be included in the axle assembly. A recess 33 that may be included the input shaft 17 is depicted in FIG. 2. The recess 33 may be profiled to receive a tool to gauge end play. For instance, a threaded plunger axially pushing and pulling on the input shaft 17 may be utilized to gauge end play displacement.

As previously discussed, the input shaft 17 may be configured to transmit power between gearing coupled to the axle assembly 11 for propulsion and/or regenerative braking of the vehicle 100, shown in FIG. 1. Thus, the mesh 42 between gear 44 and gear 40 may be included in the power path between the electric machine and the drive wheels.

The bearings 56, 60 may be positioned on opposing axial sides of the gear 44. The bearing 60 may include roller elements 19 (e.g., cylinders, tapered cylinders, balls, and the like), an inner race 20, and an outer race 21. Specifically, in the illustrated embodiment, the bearing 60 is a tapered roller bearing. However, other suitable types of bearing have been envisioned such as other types of thrust bearings, ball bearing, etc. Tapered roller bearing may be more durable and able to react higher loads than ball bearings, for example. The bearing 56 may have a similar construction to the bearing 60, in some implementations.

The bearing 60 allows the input shaft 17 to rotate within the cover 13. Thus, the inner race 20 of the bearing 60 may couple to the input shaft 17. To expound, an inner surface 76 of the inner race 20 may be in face sharing contact with an outer surface 78 of the input shaft 17. The outer race 21 may be arranged in a bearing bore 84 in the cover 13. Further, in the illustrated embodiment, the sleeve 18 contacts the inner race 20. More particularly, an end of the sleeve 18 may abut the inner race 20. In this way, the inner race 20 may be axially constrained between an axial end of the sleeve 18 and a side face of the gear 44 to decrease the chance of unwanted axial drift of the bearing on the input shaft. Arrangements where the inner race is spaced away from an end of the sleeve, have been envisioned.

The bearing adjuster 22 includes a first axial side 86 adjacent to (e.g., in face sharing contact with) a surface 87 (e.g., radially aligned side surface) of the outer race 21 to facilitate preload adjustment. The bearing adjuster 22 may further include a plurality of lugs 28 and recesses 88 on a second axial side 90 circumferentially arranged around the second axial side. The lugs 28 extend in an axial direction away from the body of the adjuster. The axle assembly 11 may further comprise an attachment device 32 designed to thread into an extension 92 of the cover 13. When the attachment device 32 is installed, an end 89 of the device mates with one of the recesses 88 to retain the bearing adjuster 22 in a desired position. In this way, the adjuster may be held in a targeted position subsequent to preload adjustment, for instance. In an alternate embodiment, the attachment device may be a set screw frictionally interfacing with a flat axial face of the bearing adjuster to retain the adjuster in position. Thus, in such an embodiment, the lugs and recesses may be omitted from the bearing adjuster, which may decrease the profile of the adjuster. The end 89 of the attachment device 32, as illustrated, axially mates with one of the recesses 88. In other implementations, the attachment device may radially extend into one of the recesses. Further, in one example, the lugs may be cast to increase the structural integrity of the lugs. However, in other examples, the lugs may be machined.

Figure 3:
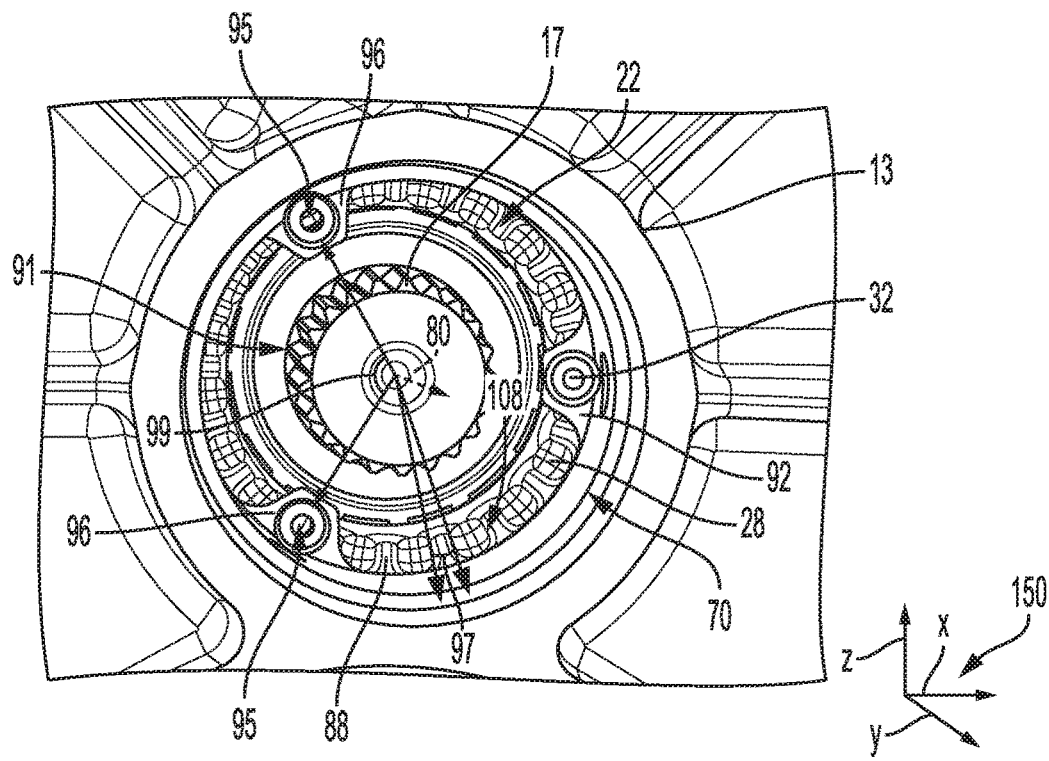
FIG. 3 shows a perspective view of a bearing adjuster and cover of the axle assembly, depicted in FIG. 2.

FIG. 3 shows a detailed illustration of the bearing adjuster 22 arranged in a bore 108 of the cover 13. As mentioned above, the bearing adjuster 22 may be designed to thread into the bore 108 to alter the preload/end play of the bearing 60, shown in FIG. 2. Splines 91 of the input shaft 17 are depicted in FIG. 3. In alternate embodiments, the shaft may not be splined.

During installation, a tool may be inserted through the lubricant bore 70 and into the recesses 88 of the bearing adjuster 22 and the adjuster may be threaded into or out of the threaded bore in the cover 13. The rotation of the bearing adjuster 22, therefore, induces bearing preload or end play modulation. Subsequently, the attachment device 32 may be threaded into the threaded opening in the extension 92. FIG. 3 depicts the extension 92 of the cover 13 with the attachment device 32 threaded therein. The accessibility of the bearing adjuster 22 through the lubricant bore may lead to greater assembly efficiency, as it is possible to precisely alter the amount of play via the bearing adjuster later in the assembly process, as opposed to axles with shims which may demand cover removal for preload or end play adjustment. The bearing adjuster described herein may provide greater preload and end play adjustment precision than shims, for example.

The extension 92 may project radially inward toward the rotational axis 80. Additional extensions 96 may radially extend from the cover 13. The extensions 96 may correspondingly include threaded openings 95 to engage the attachment device 32. Thus, during installation, the attachment device 32 may be threaded into a chosen extension. The extensions 92, 96 may be angularly arranged about axis 80. In one embodiment, the angular arrangement of the extensions 92, 96 may be selected to allow for greater preload/end play precision. For instance, in one example, the extension may be spaced apart such that only one of the threaded openings 98 in the extensions accurately aligns with the corresponding recess and allows attachment device insertion. In such an example, if the bearing adjuster 22 were threaded further into the cover by one third of a recess angle 97, the next opening would be aligned with a recess while the other two are blocked or partially blocked via the lugs 28. The recess angle 97 may be the angle formed between two radially aligned walls of adjacent lugs. Thus, the angle 99 between the extensions 96 may be the sum of sequential extension and lug angles between the extensions 96 plus one third of a recess angle.

Figure 4:
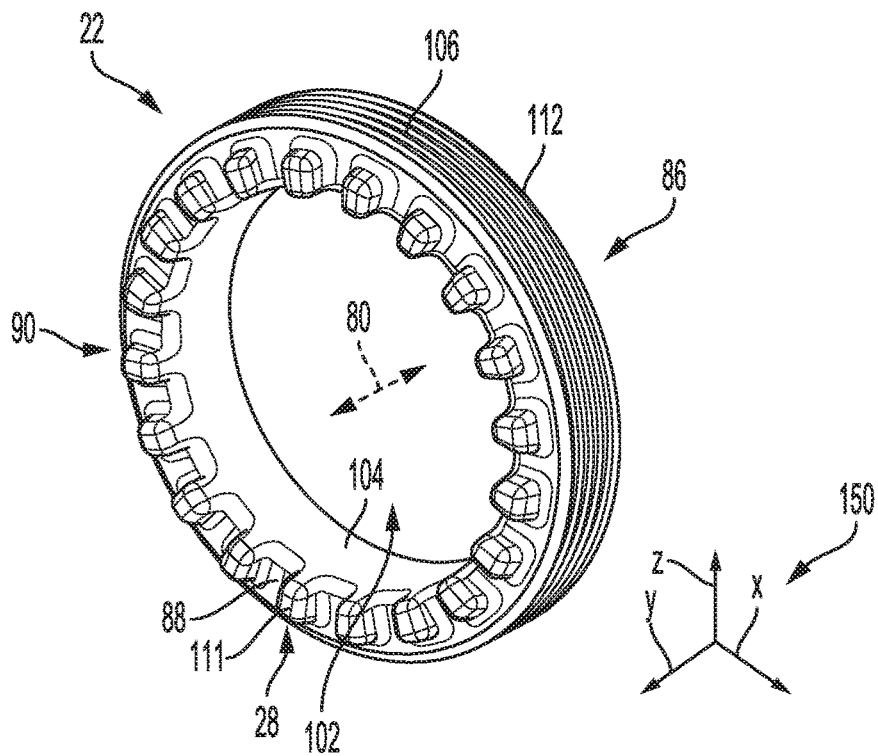
FIG. 4 shows a perspective view of an embodiment of the bearing adjuster that may be included in the axle assembly, depicted in FIG. 2.

FIG. 4 shows a detailed view of the bearing adjuster 22. The bearing adjuster 22 may generally have an annular shape with a central opening 102 bounded by an inner surface 104. The bearing adjuster 22 includes the first axial side 86 opposite the second axial side 90. The first axial side 86 may be adapted to engage or contact the outer race 21 of bearing 60, shown in FIG. 2, when setting preload or end play. The first axial side 86 includes a flat surface 112 in FIG. 4 which corresponds to a side surface 87 on the bearing's outer race, shown in FIG. 2. In other embodiments, both of the adjacent surfaces in the adjuster and bearing may be curved. The second axial side 90 include the lugs 28 and recesses 88 circumferentially spaced around the adjuster. The lugs 28 may include curved surfaces 111 which enable the attachment device (e.g., screw) to be smoothly inserted into one of the recesses, when for example, there is slight misalignment between the screw and recess. A threaded outer circumferential surface 106 of the adjuster 22 is also shown in FIG. 4. The surface 106 may be profiled to thread into the threaded bore 108 in the cover 13, shown in FIG. 5. However, in alternate embodiments, the surface 106 and the bore 108 may have a smooth profile.

Figure 5:
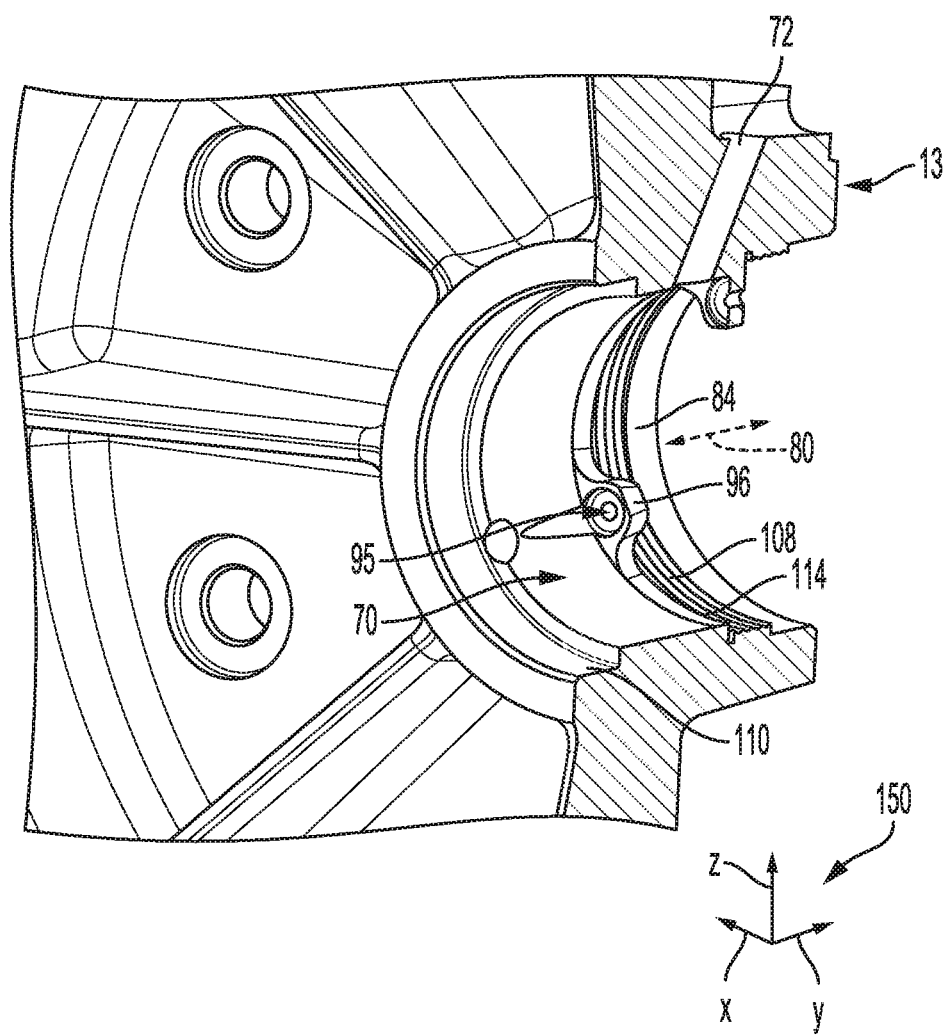
FIG. 5 shows a perspective cross sectional view of the cover included in the axle assembly, depicted in FIG. 2.

FIG. 5 shows a cross-section of the cover 13 with the central openings 68. Bores serving as mounting points for components may be included in the cover. To elaborate, the bearing bore 84 may be profiled to receive the outer race of bearing 60, illustrated in FIG. 3, and may be included in the cover 13. The threaded bore 108 may be designed to threadingly engage with the surface 106 in the bearing adjuster 22, shown in FIG. 4. A wall 114 may function as a backstop when the adjuster is initially threaded into the cover. The extensions 96 along with openings 95 are again illustrated.

A seal bore 110 may be further included in the cover 13 depicted in FIG. 5. The seal bore 110 is spaced axially away from the threaded bore 108. The seal bore 110, may receive the lubricant seal 37, shown in FIG. 2, during system assembly. Thus, the seal allows lubricant to be retained in the lubricant bore 70. Prior to sealing of the passages, the lubricant bore 70 may be used to efficiently access the bearing adjuster. The lubricant passage 72 in fluidic communication with the lubricant bore 70 is also shown in FIG. 5.

Figure 6:
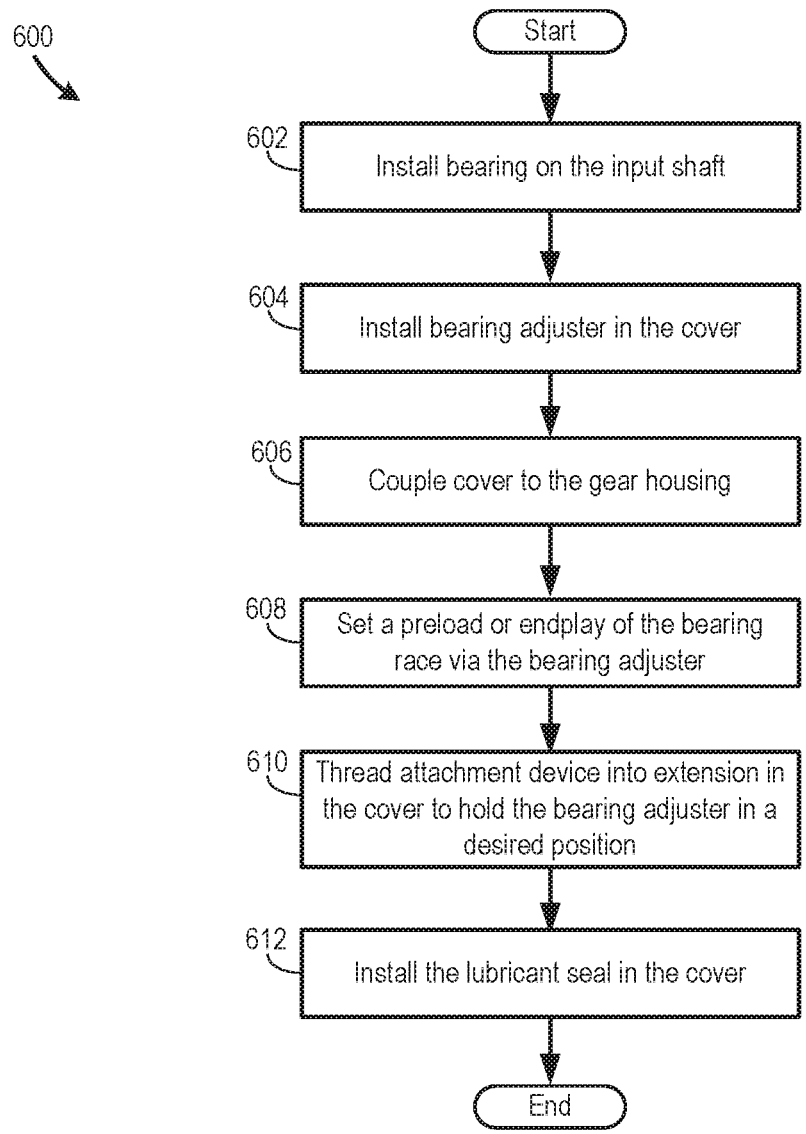
FIG. 6 shows an installation method for an axle assembly.

FIG. 6 shows an installation method 600 for an axle assembly. Specifically, the method 600 may be utilized to assemble the axle described above with regard FIGS. 1-5. However, the method 600 may be implemented to assemble other suitable axles, in other examples. It will be understood that a portion of the steps may be implemented via installation personnel and/or automated tooling machinery.

At 602, the method includes installing the bearing onto the input shaft. For instance, the bearing may be slid (e.g., interference fit) onto the input shaft. Thus, when installed, the inner bearing race may be in face sharing contact with the outer surface of the shaft. Further, prior to 602 the method may include fitting a bearing in the gear housing, arranging the input shaft on the bearing, and/or coupling the input shaft gear with a gear in an axle subassembly.

At 604, the method includes installing the bearing adjuster in the cover while the cover remains decoupled from the gear housing. For instance, the bearing adjuster may be threaded into a corresponding bore in the cover or the adjuster may be press fit into the bore. In one example, the bearing adjuster may be positioned relatively close to (e.g., adjacent to or in face sharing contact with) a flange next to the cover's extensions, which leaves room for the shaft and bearing during installation.

At 606, the method includes coupling the cover to the gear housing. The cover may be coupled to the gear housing via bolts or other suitable attachment devices. The mesh between the input shaft gear and the gear in the subassembly gear reduction may be at least partially enclosed via the gear housing.

At 608, the method comprises setting a preload or end play of the bearing via the bearing adjuster. The adjuster may be manipulated via tools inserted through the lubricant bore in the cover. In this way, bearing preload or end play may be adjusted while the cover is installed (e.g., coupled to a side of the gear housing spaced away from the differential). The bearing's preload and end play may be adjusted using a tool (e.g., a cylindrical tool with pins design to mate with the adjuster's recesses) which engages the bearing adjuster for rotation. Bearings preload or end play may, therefore, be adjusted while the cover is coupled to the gear housing. Thus, the preload or end play may be set at a later stage in installation, when compared to other axle designs. Thus, in certain examples, the generation of waste material stemming from the removal and discard of components, such as bolts and bearing cups for shim fitment, may be avoided. In this way, installation time and material efficiency may be derived from the manufacturing method 600, if so desired.

At 610, the method comprises threading the attachment device into one of the extension openings on the interior of the cover. Threading the attachment device through the opening allows the end of the device to mate with one of the recesses in the bearing adjuster. The attachment device may be manipulated via a tool (e.g., driver or wrench) engaging the head of the attachment device. The attachment device serves to retain the bearing adjuster in a targeted position after setting bearing preload or end play. This bearing adjuster retention decreases the chance of the adjuster falling out of a desired position or range of positions in the cover during axle operation, in some cases. The likelihood of unexpected bearing adjuster preload or end play variance is reduced, and the longevity of the axle assembly may be correspondingly extended.

At 612, the method comprises installing the lubricant seal into the lubricant bore. In this way, the lubricant bore may be sealed subsequent to manipulation of the bearing adjuster to set bearing preload or end play. Subsequently, the electric motor may be attached to the assembly by attaching the motor's housing to the cover and the motor's output shaft to the input shaft, via the sleeve and/or other suitable attachment technique.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" is construed to mean plus or minus five percent or less of a range or value unless otherwise specified.

The invention will be further described in the following paragraphs. In one aspect, an axle assembly is provided that comprises a cover at least partially circumferentially surrounding a shaft; a bearing coupled to the shaft and the cover, wherein the bearing includes an outer race; a bearing adjuster including a first axial side adjacent to the outer race and configured to set a bearing preload and/or end play; and a lubricant seal spaced axially away from the bearing adjuster and sealing a lubricant bore, wherein the lubricant bore traverses the cover and extends axially toward the bearing adjuster.

In another aspect, an electric axle assembly is provided that comprises a cover at least partially circumferentially surrounding an output shaft of an electric machine; an input shaft coupled to the output shaft and including an input shaft gear forming a mesh with a gear in a gear reduction; a bearing coupled to the input shaft and the cover, wherein the bearing includes an outer race; a bearing adjuster including a first axial side in face sharing contact with the outer race and configured to set a bearing preload and/or end play; and a lubricant seal spaced axially away from the bearing adjuster and sealing a lubricant bore, wherein the lubricant bore traverses the cover and extends axially toward the bearing adjuster.

In any of the aspects or combinations of the aspects, shaft may be an input shaft coupled to an output shaft of an electric machine and wherein the cover is coupled to a housing of the electric machine.

In any of the aspects or combinations of the aspects, the bearing adjuster may include a threaded outer surface engaging with a threaded surface in the cover and wherein threading and unthreading of the bearing adjuster alters the bearing preload or end play.

In any of the aspects or combinations of the aspects, the axle assembly may further comprise an axially aligned attachment device threaded into a first extension of the cover and configured to retain the bearing adjuster in a set position.

In any of the aspects or combinations of the aspects, the cover may further comprise a second extension designed to threadingly engage with the axially aligned attachment device.

In any of the aspects or combinations of the aspects, the axially aligned attachment device may be accessible via the lubricant bore when the lubricant seal is removed.

In any of the aspects or combinations of the aspects, the bearing adjuster may include a plurality of lugs and recesses on a second axial side and wherein an end of the axially aligned attachment device mates with one of the plurality of recesses.

In any of the aspects or combinations of the aspects, the axle assembly may further comprise a lubricant passage in fluidic communication with the lubricant bore and a gear mesh, wherein the gear mesh is formed between a gear on the shaft and a gear in an axle subassembly.

In any of the aspects or combinations of the aspects, the bearing may be a thrust bearing.

In any of the aspects or combinations of the aspects, the axle assembly may further comprise a gear housing coupled to the cover.

In any of the aspects or combinations of the aspects, the axle assembly may further comprise an axle subassembly coupled to the gear housing, wherein the axle subassembly may include a differential.

In any of the aspects or combinations of the aspects, the axle assembly may further comprise an axially aligned attachment device threaded into a first or a second extension of the cover and wherein the axially aligned attachment device is accessible when the lubricant seal is removed.

In any of the aspects or combinations of the aspects, the bearing adjuster may include a threaded outer surface engaging with a threaded surface in the cover and wherein threading and unthreading of the bearing adjuster may alter the bearing preload or end play.

In any of the aspects or combinations of the aspects, an outer diameter of the lubricant seal may be less than or equal to an outer diameter of the outer race.

In any of the aspects or combinations of the aspects, the bearing adjuster may include a plurality of lugs and recesses on a second axial side and wherein an end of the axially aligned attachment device may mate with one of the plurality of recesses.

In any of the aspects or combinations of the aspects, the electric axle assembly may further comprise a sleeve coupling the input shaft to the output shaft, wherein an outer surface of the sleeve may form a portion of a periphery of the lubricant bore.

In any of the aspects or combinations of the aspects, the electric axle assembly may further comprise a lubricant passage in fluidic communication with the lubricant bore and a gear mesh, wherein the gear mesh is formed between the input shaft gear and a gear in an axle subassembly.

In any of the aspects or combinations of the aspects, the electric axle assembly may further comprise a gear housing coupled to the cover and an axle subassembly coupled to the gear housing, wherein the axle subassembly includes a differential.

In any of the aspects or combinations of the aspects, the lubricant passage may extend axially away from the lubricant seal.

In any of the aspects or combinations of the aspects, a sleeve may couple the input shaft to the output shaft and forms a portion of a boundary of the lubricant bore.

In another representation, an electrified axle system is provided that includes a bearing preload/endplay adjustment device next to an outer race of a bearing supporting a gear shaft, the gear shaft meshing with a gear reduction designed to transfer torque to an axle differential, wherein the bearing preload/endplay adjustment device is axially spaced away from a lubricant seal and wherein the bearing preload/endplay adjustment device is accessible on one side through an opening in the cover when the seal is decoupled from the cover.

While various embodiments have been described above, they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. Thus, modifications and changes may be made to the embodiments described herein. The description therefore does not limit the invention to the exact construction and processes shown and described herein. Accordingly, all suitable modifications and equivalents may be considered as falling within the scope of the invention as defined by the claims which follow. Hence, specific dimensions, directions, or other physical characteristics relating to the embodiments disclosed are not to be considered as limiting, unless expressly stated otherwise.

It will be appreciated that the configurations and routines disclosed herein are exemplary in nature, and that these specific examples are not to be considered in a limiting sense, because numerous variations are possible. The assemblies, devices, and methods illustrated in the attached drawings, and described above are simply exemplary embodiments of the inventive concepts. For example, the above technology can be applied to vehicle systems that include different types of propulsion sources including different types of electric machines and axle assemblies. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An axle assembly, comprising:
a cover at least partially circumferentially surrounding a shaft;
a bearing coupled to the shaft and the cover, wherein the bearing includes an outer race;
a bearing adjuster including a first axial side adjacent to the outer race, wherein the bearing adjuster sets a bearing preload or end play; and
a lubricant seal spaced axially away from the bearing adjuster and sealing a lubricant bore, wherein the lubricant bore traverses the cover and extends axially toward the bearing adjuster,
wherein the shaft is an input shaft coupled to an output shaft of an electric machine and wherein the cover is coupled to a housing of the electric machine.

2. The axle assembly of claim 1, wherein the bearing adjuster includes a threaded outer surface engaging with a threaded surface in the cover and wherein threading and unthreading of the bearing adjuster alters the bearing preload or end play.

3. The axle assembly of claim 1, further comprising an axially aligned attachment device threaded into a first extension of the cover, the axially aligned attachment device retains the bearing adjuster in a set position.

4. The axle assembly of claim 3, wherein the cover further comprises a second extension designed to threadingly engage with the axially aligned attachment device.

5. The axle assembly of claim 4, wherein the axially aligned attachment device is accessible via the lubricant bore when the lubricant seal is removed.

6. The axle assembly of claim 3, wherein the bearing adjuster includes a plurality of lugs and recesses on a second axial side and wherein an end of the axially aligned attachment device mates with one of the plurality of recesses.

7. The axle assembly of claim 1, further comprising a lubricant passage in fluidic communication with the lubricant bore and a gear mesh, wherein the gear mesh is formed between a gear on the shaft and a gear in an axle subassembly.

8. The axle assembly of claim 1, wherein the bearing is a thrust bearing.

9. The axle assembly of claim 1, further comprising a gear housing coupled to the cover.

10. The axle assembly of claim 9, further comprising an axle subassembly coupled to the gear housing, wherein the axle subassembly includes a differential.

11. An electric axle assembly, comprising:
a cover at least partially circumferentially surrounding an output shaft of an electric machine;
an input shaft coupled to the output shaft and including an input shaft gear forming a mesh with a gear in a gear reduction;
a bearing coupled to the input shaft and the cover, wherein the bearing includes an outer race;
a bearing adjuster including a first axial side in face sharing contact with the outer race, the bearing adjuster sets a bearing preload or end play; and
a lubricant seal spaced axially away from the bearing adjuster and sealing a lubricant bore, wherein the lubricant bore traverses the cover and extends axially toward the bearing adjuster.

12. The electric axle assembly of claim 11, further comprising an axially aligned attachment device threaded into a first or a second extension of the cover and wherein the axially aligned attachment device is accessible when the lubricant seal is removed.

13. The electric axle assembly of claim 12, wherein the bearing adjuster includes a threaded outer surface engaging with a threaded surface in the cover and wherein threading and unthreading of the bearing adjuster alters the bearing preload or end play.

14. The electric axle assembly of claim 11, wherein an outer diameter of the lubricant seal is less than or equal to an outer diameter of the outer race.

15. The electric axle assembly of claim 12, wherein the bearing adjuster includes a plurality of lugs and recesses on a second axial side and wherein an end of the axially aligned attachment device mates with one of the plurality of recesses.

16. The electric axle assembly of claim 11, further comprising a sleeve coupling the input shaft to the output shaft, wherein an outer surface of the sleeve forms a portion of a periphery of the lubricant bore.

17. The electric axle assembly of claim 16, further comprising a lubricant passage in fluidic communication with the lubricant bore and a gear mesh, wherein the gear mesh is formed between the input shaft gear and a gear in an axle subassembly.

18. The electric axle assembly of claim 17, wherein the lubricant passage extends axially away from the lubricant seal.

19. The electric axle assembly of claim 11, further comprising a gear housing coupled to the cover and an axle subassembly coupled to the gear housing, wherein the axle subassembly includes a differential.

* * * * *